No. 785,495.

Patented March 21, 1905.

UNITED STATES PATENT OFFICE.

THOMAS C. JEFFRIES, OF COLUMBUS, OHIO.

PROCESS OF ENRICHING EARTH.

SPECIFICATION forming part of Letters Patent No. 785,495, dated March 21, 1905.

Application filed March 7, 1903. Serial No. 146,761.

*To all whom it may concern:*

Be it known that I, THOMAS C. JEFFRIES, a citizen of the United States, residing at Columbus, in the county of Franklin and State of Ohio, have invented a certain new and useful Improvement in Processes of Enriching Earth, of which the following is a specification.

My invention relates to an improved process for enriching earth, the objects of my invention being to combine with a quantity of earth ingredients which will result in so enriching said earth or soil as to give a largely-increased nourishment to plants or other vegetation.

In carrying out my invention I mix or mingle with the earth in the order named sulfuric acid, lime, and salt, the proportions, by weight, of the ingredients being substantially as follows: earth, fifty-five per cent.; commercial sulfuric acid, twenty-five per cent.; finely-divided lime, fifteen per cent., and salt five per cent.

It has been determined that the mixture of the aforesaid ingredients results in such disintegration of the particles of earth as to release the plant or vegetation food contained therein and permit the same to act directly upon the roots of the growing plants or other vegetation.

What I claim, and desire to secure by Letters Patent, is—

The herein-described process of enriching earth, consisting in combining with a quantity of earth, predetermined proportions of strong sulfuric acid, lime and salt, the several ingredients being brought together in the proportions of fifty-five per cent. earth, twenty-five per cent. sulfuric acid, fifteen per cent. lime and five per cent. salt, substantially as specified.

THOMAS C. JEFFRIES.

In presence of—
A. L. PHELPS,
W. L. MORROW.